(12) United States Patent
Prasanna et al.

(10) Patent No.: US 10,827,411 B2
(45) Date of Patent: Nov. 3, 2020

(54) DEPLOYMENT OF A WIRELESS AIRCRAFT NETWORK

(71) Applicant: ROSEMOUNT AEROSPACE INC., Burnsville, MN (US)

(72) Inventors: Ramamurthy Prasanna, Karnataka (IN); Subhra Kanti Das, Karnataka (IN); Adishesha Chinknyakanhalli Sivaramasastry, Karnataka (IN)

(73) Assignee: ROSEMOUNT AEROSPACE, INC, Burnsville, MN (US)

( * ) Notice: Subject to any disclaimer, the term of this patent is extended or adjusted under 35 U.S.C. 154(b) by 0 days.

(21) Appl. No.: 16/383,883

(22) Filed: Apr. 15, 2019

(65) Prior Publication Data

US 2020/0092788 A1 Mar. 19, 2020

(30) Foreign Application Priority Data

Sep. 13, 2018 (IN) .............................. 201811034573

(51) Int. Cl.
*H04W 40/08* (2009.01)
*H04B 17/318* (2015.01)
*H04B 7/185* (2006.01)
*H04W 40/10* (2009.01)
(Continued)

(52) U.S. Cl.
CPC ........ *H04W 40/08* (2013.01); *H04B 7/18506* (2013.01); *H04B 17/318* (2015.01); *H04W 40/10* (2013.01); *H04W 52/365* (2013.01); *H04W 76/15* (2018.02)

(58) Field of Classification Search
CPC ... H04W 52/365; H04W 40/08; H04W 84/18; H04W 76/15; H04W 48/16; H04W 40/10; H04W 84/06; H04W 48/17; H04L 2012/4028; H04B 17/318; H04B 7/18506
See application file for complete search history.

(56) References Cited

U.S. PATENT DOCUMENTS

| 7,567,822 B2 | 7/2009 | Hart et al. |
| 8,462,747 B2 | 6/2013 | Dacosta et al. |
| 8,694,624 B2 | 4/2014 | Sinha et al. |

(Continued)

FOREIGN PATENT DOCUMENTS

| EP | 2139275 A2 | 12/2009 |
| EP | 2978271 A1 | 1/2016 |

OTHER PUBLICATIONS

Dhouha et al., "An optimized spectrum allocation scheme for future aircraft Cognitive Radio Wireless Sensor Networks," 2014 14th International Symposium on Communications and Information Technologies (ISCIT), IEEE, Sep. 24, 2014, pp. 107-111.

*Primary Examiner* — Brian D Nguyen
(74) *Attorney, Agent, or Firm* — Cantor Colburn LLP

(57) ABSTRACT

Systems and methods for wireless network deployment are provided. Aspects include scanning, by a network controller, a plurality of wireless channels to determine an energy level for each channel in the plurality of wireless channels. Selecting a primary channel and a secondary channel from the plurality of wireless channels based at least in part on the energy level. Selecting a primary wireless controller and a secondary wireless data controller for each of the plurality of the wireless sensor nodes and establishing wireless communication with each of a plurality of wireless sensors over the primary channel and the secondary channel.

18 Claims, 5 Drawing Sheets

(51) Int. Cl.
*H04W 52/36* (2009.01)
*H04W 76/15* (2018.01)

(56) References Cited

U.S. PATENT DOCUMENTS

| | | |
|---|---|---|
| 9,232,499 B1 | 1/2016 | Banerjea et al. |
| 10,165,531 B1* | 12/2018 | Behera .................... H04W 4/70 |
| 2006/0094369 A1 | 5/2006 | Nguyen |
| 2009/0040108 A1* | 2/2009 | Katz ..................... G01S 5/0231 |
| | | 342/386 |
| 2016/0262071 A1* | 9/2016 | Gu ........................ H04W 36/26 |
| 2016/0373963 A1 | 12/2016 | Chechani |
| 2018/0349235 A1* | 12/2018 | Freydel ............... G06F 11/1633 |
| 2019/0193708 A1* | 6/2019 | Kordik ................ F16K 37/0041 |
| 2019/0277709 A1* | 9/2019 | Miller .................... G01K 3/005 |
| 2020/0065405 A1* | 2/2020 | Gandenberger .... G06F 16/9024 |
| 2020/0077437 A1* | 3/2020 | Stern-Berkowitz .......................... |
| | | H04W 74/02 |

\* cited by examiner

DEPLOYMENT OF A WIRELESS AIRCRAFT NETWORK

CROSS-REFERENCE TO RELATED APPLICATIONS

This application claims the benefit of Indian provisional application no. 201811034573 filed Sep. 13, 2018, which is incorporated herein by reference in its entirety.

BACKGROUND

Exemplary embodiments pertain to the art of avionics communication and more particularly to deployment of a wireless aircraft network.

Architecture of aircraft is evolving based on application needs, customer needs, market segments and the availability of advanced technologies. In the process of making advanced technologies more available on aircraft, there are attempts to make aircraft more intelligent, more electrical and more data driven. Considering the cost of an aircraft design life cycle and operations, it is may be beneficial to have modular and re-usable architecture while still maintaining robustness and reliability. At present, aircraft communication is predominantly wired using point-to-point wired connections and/or bus connections. Typically, aircraft systems communicate with each other through a standard, wired interface such as, for example, avionic buses CAN, Ethernet, and the like. For wired interfaces, electromagnetic interferences is relatively minimal and network deployment primarily involves configuration of network elements and message scheduling. However, deployment of wired network application involves significant manual effort, leading to sub-optimal network configurations and higher deployment time and costs. Also, scalability of large wired networks may be limited by challenges in cable routing and associated certification activities.

BRIEF DESCRIPTION

Disclosed is an exemplary avionic wireless sensor system. The system includes a plurality of wireless sensors, a plurality of wireless data controllers each including a processing circuit and memory, and a network controller configured to operate the plurality of wireless data controllers and to perform a wireless network deployment operation responsive to a deployment trigger, the wireless network deployment operation including scanning a plurality of wireless channels to determine an energy level for each channel in the plurality of wireless channels. Selecting a primary channel and a secondary channel from the plurality of wireless channels based at least in part on the energy level. Selecting a primary wireless controller and a secondary wireless data controller for each of the plurality of the wireless sensor nodes and establishing wireless communication with each of a plurality of wireless sensors over the primary channel and the secondary channel.

In addition to one or more of the features described above, or as an alternative to any of the foregoing embodiments, further embodiments may include that establishing wireless communication with each of the plurality of wireless sensors over the primary channel and the secondary channel includes transmitting, by the plurality of wireless data controllers, a beacon signal to the plurality of wireless sensors on a pre-defined wireless channel, wherein each of the plurality of wireless sensors are configured to scan for the beacon signal periodically. Establishing wireless communication with each of the plurality of wireless sensors over the predefined channel. Transmitting credentialing data to the plurality of wireless sensors over the predefined channel responsive to receiving, from the plurality of wireless sensors, the credentialing data establishing a primary connection with each of the plurality of wireless sensors on the corresponding first wireless data controller on the primary channel and establishing a secondary connection with each of the plurality of wireless sensors on the corresponding second wireless data controller on the secondary channel.

In addition to one or more of the features described above, or as an alternative to any of the foregoing embodiments, further embodiments may include that establishing the primary connection with the first wireless data controller is based on one or more signal characteristics of the primary channel on the first gateway device.

In addition to one or more of the features described above, or as an alternative to any of the foregoing embodiments, further embodiments may include that the network controller is further configured to receive sensor configuration data from each of the plurality of wireless sensors, wherein the sensor data interface data comprises network parameters for the wireless sensor, store the sensor configuration data for each of the plurality of wireless sensors in a deployment matrix in the memory, and transmit the deployment matrix to each of the plurality of the wireless data controllers.

In addition to one or more of the features described above, or as an alternative to any of the foregoing embodiments, further embodiments may include that the network controller is further configured to periodically obtain sensor configuration data from each of the plurality of wireless sensors, compare the obtained sensor configuration data to the sensor configuration data in the deployment matrix, and based on a determination that the obtained sensor configuration data does not match the sensor configuration data in the deployment matrix, triggering the wireless network deployment operation.

In addition to one or more of the features described above, or as an alternative to any of the foregoing embodiments, further embodiments may include that determining the energy level for each channel in the plurality of wireless channels includes obtaining, by the plurality of wireless data controllers, a plurality of sample energy levels for each wireless channel and averaging the plurality of sample energy levels to determine the energy level for each channel in the plurality of wireless channels.

In addition to one or more of the features described above, or as an alternative to any of the foregoing embodiments, further embodiments may include that the selecting the primary channel and the secondary channel includes comparing the energy level of each channel in the plurality of wireless channels to a calculated threshold to identify two or more candidate channels in the plurality of wireless channels that include energy levels below the calculate threshold, selecting the primary channel from the two or more candidate channels, and selecting the secondary channel from the two or more candidate channels, wherein the energy level for the primary channel is less than the energy level for the secondary channel.

In addition to one or more of the features described above, or as an alternative to any of the foregoing embodiments, further embodiments may include that the plurality of wireless sensors are located on an aircraft.

In addition to one or more of the features described above, or as an alternative to any of the foregoing embodiments, further embodiments may include that the network controller is further configured to trigger the wireless network deployment operation based at least in part on an operation of the aircraft.

In addition to one or more of the features described above, or as an alternative to any of the foregoing embodiments, further embodiments may include that the controller is further configured to trigger the wireless network deployment operation periodically.

Also disclosed is a method for deployment of a wireless network that includes scanning, by a network controller, a plurality of wireless channels to determine an energy level for each channel in the plurality of wireless channels. Selecting a primary channel and a secondary channel from the plurality of wireless channels based at least in part on the energy level. Selecting a primary wireless controller and a secondary wireless data controller for each of the plurality of the wireless sensor nodes and establishing wireless communication with each of a plurality of wireless sensors over the primary channel and the secondary channel.

In addition to one or more of the features described above, or as an alternative to any of the foregoing embodiments, further embodiments may include establishing wireless communication with each of the plurality of wireless sensors over the primary channel and the secondary channel includes transmitting, by a plurality of wireless data controllers, a beacon signal to the plurality of wireless sensors on a pre-defined wireless channel, wherein each of the plurality of wireless sensors are configured to scan for the beacon signal periodically, establishing wireless communication with each of the plurality of wireless sensors over the predefined channel, transmitting credentialing data to the plurality of wireless sensors over the predefined channel, and responsive to receiving, from the plurality of wireless sensors, the credentialing data establishing a primary connection with each of the plurality of wireless sensors on the first corresponding wireless data controller on the primary channel and establishing a secondary connection with each of the plurality of wireless sensors on the corresponding second wireless data controller on the secondary channel.

In addition to one or more of the features described above, or as an alternative to any of the foregoing embodiments, further embodiments may include that establishing the primary connection with the first wireless data controller is based on one or more signal characteristics of the primary channel on the first gateway device.

In addition to one or more of the features described above, or as an alternative to any of the foregoing embodiments, further embodiments may include receiving sensor configuration data from each of the plurality of wireless sensors, wherein the sensor data interface data comprises network parameters for the wireless sensor and storing the sensor configuration data for each of the plurality of wireless sensors in a deployment matrix in the memory.

In addition to one or more of the features described above, or as an alternative to any of the foregoing embodiments, further embodiments may include periodically obtaining sensor configuration data from each of the plurality of wireless sensors, comparing the obtained sensor configuration data to the sensor configuration data in the deployment matrix, and based on a determination that the obtained sensor configuration data does not match the sensor configuration data in the deployment matrix, triggering a wireless network redeployment operation.

In addition to one or more of the features described above, or as an alternative to any of the foregoing embodiments, further embodiments may include that determining the energy level for each channel in the plurality of wireless channels includes obtaining, by a plurality of wireless data controllers, a plurality of sample energy levels for each wireless channel and averaging the plurality of sample energy levels to determine the energy level for each channel in the plurality of wireless channels.

In addition to one or more of the features described above, or as an alternative to any of the foregoing embodiments, further embodiments may include that the selecting the primary channel and the secondary channel includes comparing the energy level of each channel in the plurality of wireless channels to a calculated threshold to identify two or more candidate channels in the plurality of wireless channels that include energy levels below the calculate threshold, selecting the primary channel from the two or more candidate channels, and selecting the secondary channel from the two or more candidate channels, wherein the energy level for the primary channel is less than the energy level for the secondary channel.

In addition to one or more of the features described above, or as an alternative to any of the foregoing embodiments, further embodiments may include that the plurality of wireless sensors are located on an aircraft.

In addition to one or more of the features described above, or as an alternative to any of the foregoing embodiments, further embodiments may include triggering a wireless network redeployment operation based at least in part on an operation of the aircraft.

In addition to one or more of the features described above, or as an alternative to any of the foregoing embodiments, further embodiments may include triggering a wireless network redeployment operation periodically.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed systems and methods are presented with reference to the Figures by way of example and not limitation.

Generally, the aerospace industry is moving towards replacing the onboard wired networks for aircraft with wireless solutions. However, wireless networks on aircrafts present challenges. Some of these challenges include issues with establishing a seamless communication between network elements in the presence of electromagnetic interference from existing onboard radio communication systems for the aircraft (e.g., Wi-Fi and multi-path radio propagation due to the aircraft internal structure.) Another challenge includes issues with optimizing the network topology and deployment time for the application specific spatial distribution of the network elements and installation zones. Also, aircraft downtime for deployment of the wireless network elements can be costly.

The disclosure now provides a process for automatically evaluating an aircraft environment and providing a deployment architecture for a wireless aircraft network to reduce network installation time and cost. This automated process defines network topology and configuration by selection of optimal wireless network channels. Also, this process allows for network re-configuration for the addition and removal of network nodes.

Figure 1:
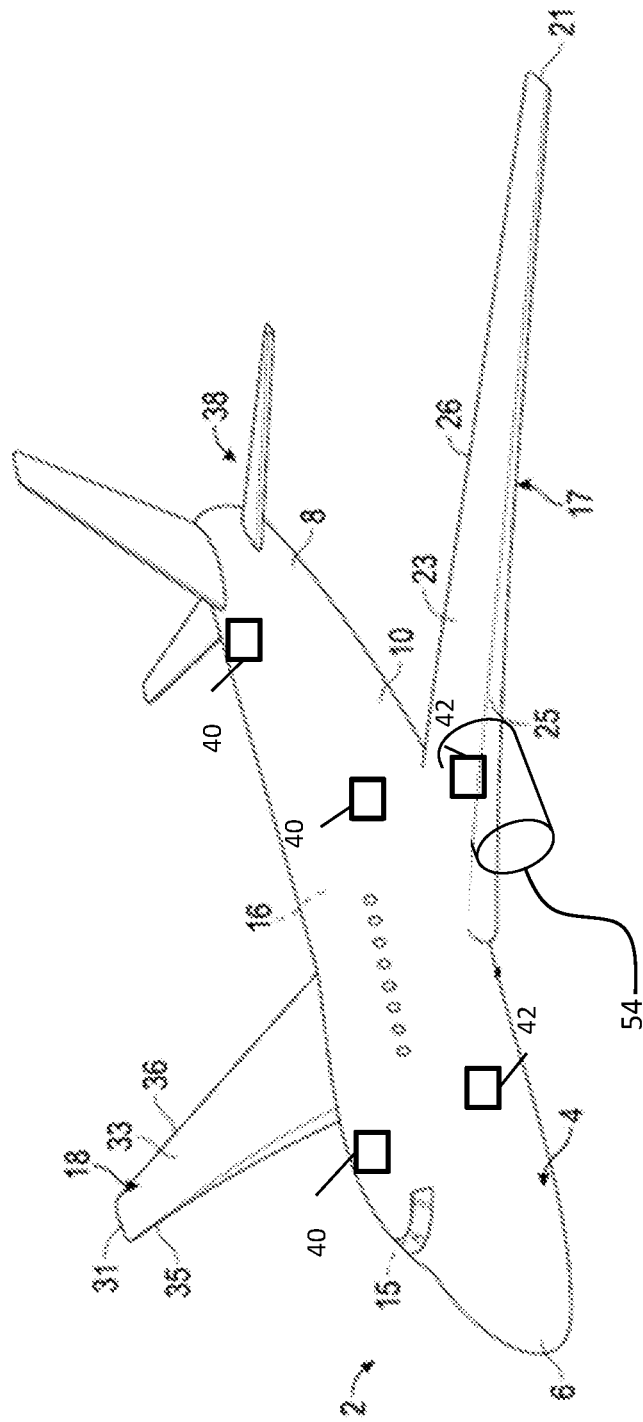
FIG. 1 is a perspective view of an aircraft that may incorporate embodiments of the present disclosure.

Referring now to the figures, FIG. 1 depicts a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2.

In embodiments, the aircraft 2 includes one or more wireless data controllers 40 operable to establish wireless communication with a plurality of sensors 42. The sensors 42 can have the same or different characteristics in terms of data rates and priorities in the context of particular avionic applications. Some sensors 42 may only generate updated values several times per second, while other sensors 42 may generate hundreds or thousands of updated values per second. For instance, some sensor data can be event driven and other sensor data is continuously generated at a known interval. Further, some sensor data is exclusively used for monitoring but not control operations, while other sensor data may be used for both monitoring and control operations or exclusively for control operations on the aircraft 2.

Figure 2:
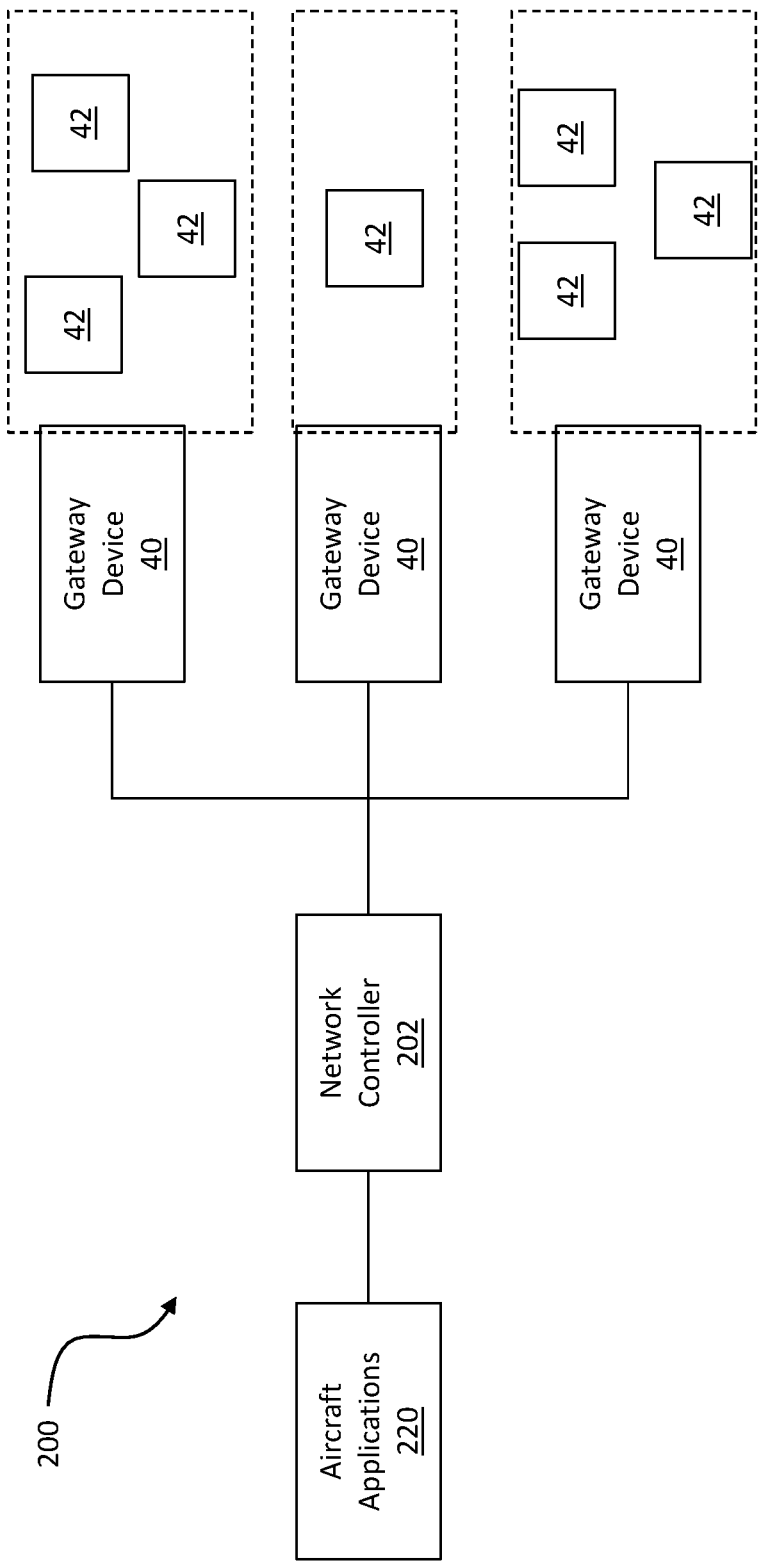
FIG. 2 is a block diagram of a system in accordance with an embodiment of the disclosure.

Turning now to a more detailed description of aspects of the present disclosure, FIG. 2 depicts a diagram of an avionic wireless sensor system according to one or more embodiments. The system 200 includes a network controller 202 that is configured to operate multiple wireless data controllers 40. In some embodiments, the multiple wireless data controllers 40 can be wireless routers or switches deployed throughout an aircraft or other vehicle. The wireless data controllers 40 are operable to connect to sensors 42 via wireless networking protocols such as, for example, IEEE 802.15. As such, sensors 42 are referred to wireless sensors.

The wireless sensors 42 can include a sensing means, a transceiver, and a battery or other power source. The wireless sensors 42 can transmit sensor data to the wireless data controllers 40 which are managed by the network manager 202. The network manager 202 can interface with one or more aircraft applications 220 and provide the sensor data received from the wireless sensors 42. While the illustrated example shows an airplane, any type of vehicle can be utilized for deployment of these wireless sensors including, but not limited to, helicopters, ships, and any other vehicle that may or may not have the potential for electromagnetic interference.

In some embodiments, the network controller 202, wireless data controllers 40, and sensors 42 can be implemented by executable instructions and/or circuitry such as a processing circuit and memory. The processing circuit can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory may include random access memory (RAM), read only memory (ROM), or other electronic, optical, magnetic, or any other computer readable medium onto which is stored data and algorithms as executable instructions in a non-transitory form.

In one or more embodiments, the network controller 202 is configured to deploy and re-deploy a wireless network that utilizes two channels to connect to each wireless sensor 42. Each of the wireless data controllers 40 can broadcast more than one channel for the sensors 42 to connect to. The wireless sensors 42 can connect to two of the wireless data controllers 40 based on signal characteristics for the data controllers 40 or any other characteristic such as proximity, for example. The network controller 202 can re-deploy the wireless network based on a wireless sensor 42 coming online or going offline or for any other reason such as, for example, a change in the aircraft operation or can be done periodically.

Figure 3:
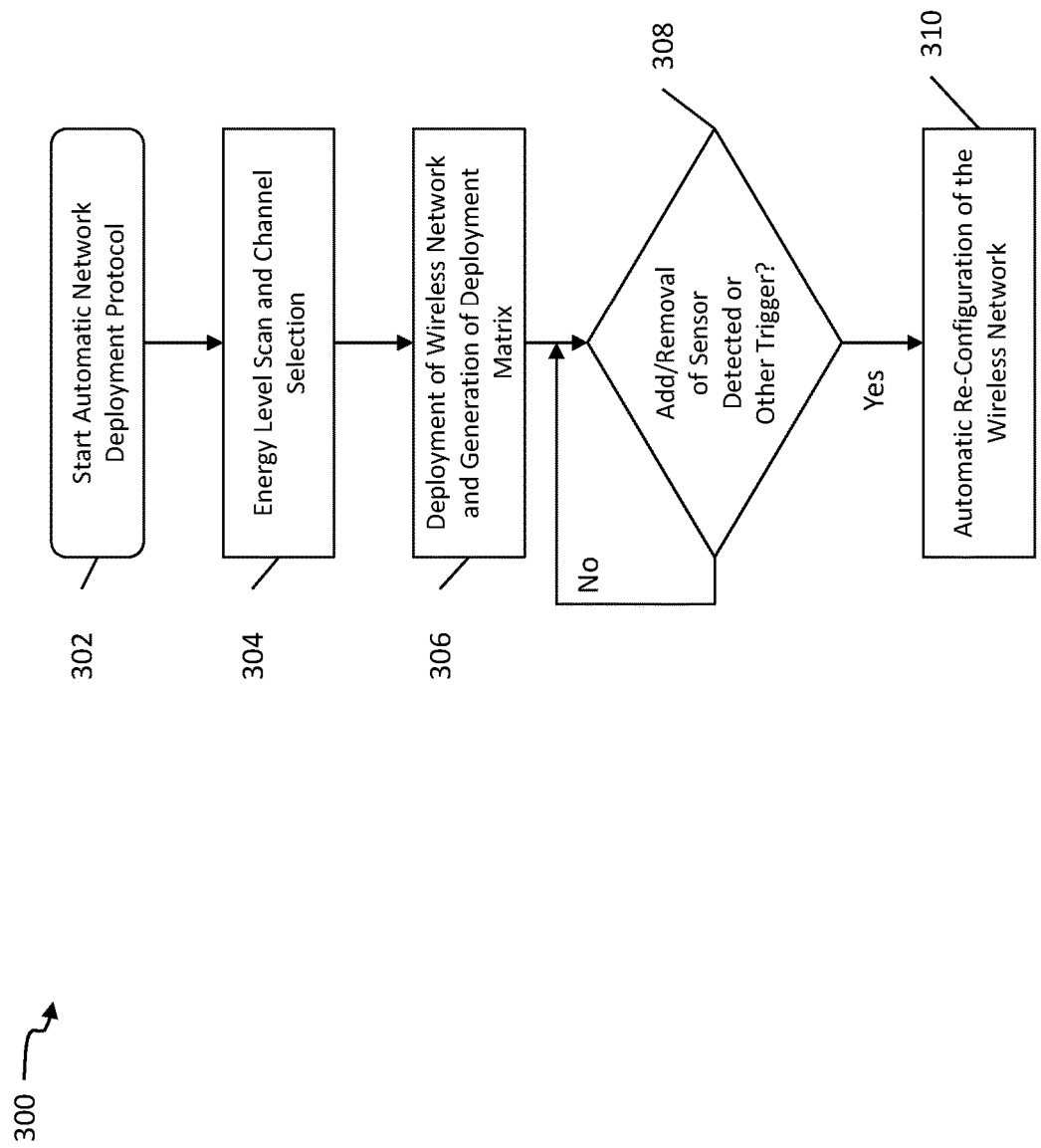
FIG. 3 is a process flow of a method in accordance with an embodiment of the disclosure.

FIG. 3 depicts a flow diagram of an exemplary method for deploying a wireless network. The method 300 begins at process step 302 which is the initiation of the network deployment. Before connecting to any network nodes (e.g., wireless sensors 42), the network controller 202 first scans the energy level of the operating network channels to identify and select the two least energized network channels (primary and secondary) for use in the network, as shown at block 304. This process step 304 will be discussed in greater detail with reference to FIG. 4. Once the two network channels are selected, the process step 306 has the network controller 202 deploy the wireless network through the wireless data controllers 40 to connect to network nodes (e.g., wireless sensors 42). Once the network is deployed, the network controller 202 can monitor the network nodes to determine, at decision block 308, whether a network node goes offline or comes back online. If a network node does get added/removed, the process step 310 is initiated and the network controller 202 automatically reconfigures the wireless network by proceeding to process step 310. If no network node is added/removed, the network controller 202 continues to operate the wireless network. In one or more embodiments, reconfiguration process step 310 can be initiated based on reconfiguration trigger as shown in decision block 308. These triggers can include that a certain amount of time has elapsed, an operation of the aircraft, a user request, a change in energy level of the primary or secondary channel, and the like. For example, an operation of the aircraft that triggers a reconfiguration can include a change in altitude, a landing or take-off operation, environmental factors such weather, or at an aircraft user's request.

Additional processes may also be included. It should be understood that the processes depicted in FIG. 3 represent mere illustrations and that other processes may be added or existing processes may be removed, modified, or rearranged without departing from the scope and spirit of the present disclosure.

Figure 4:
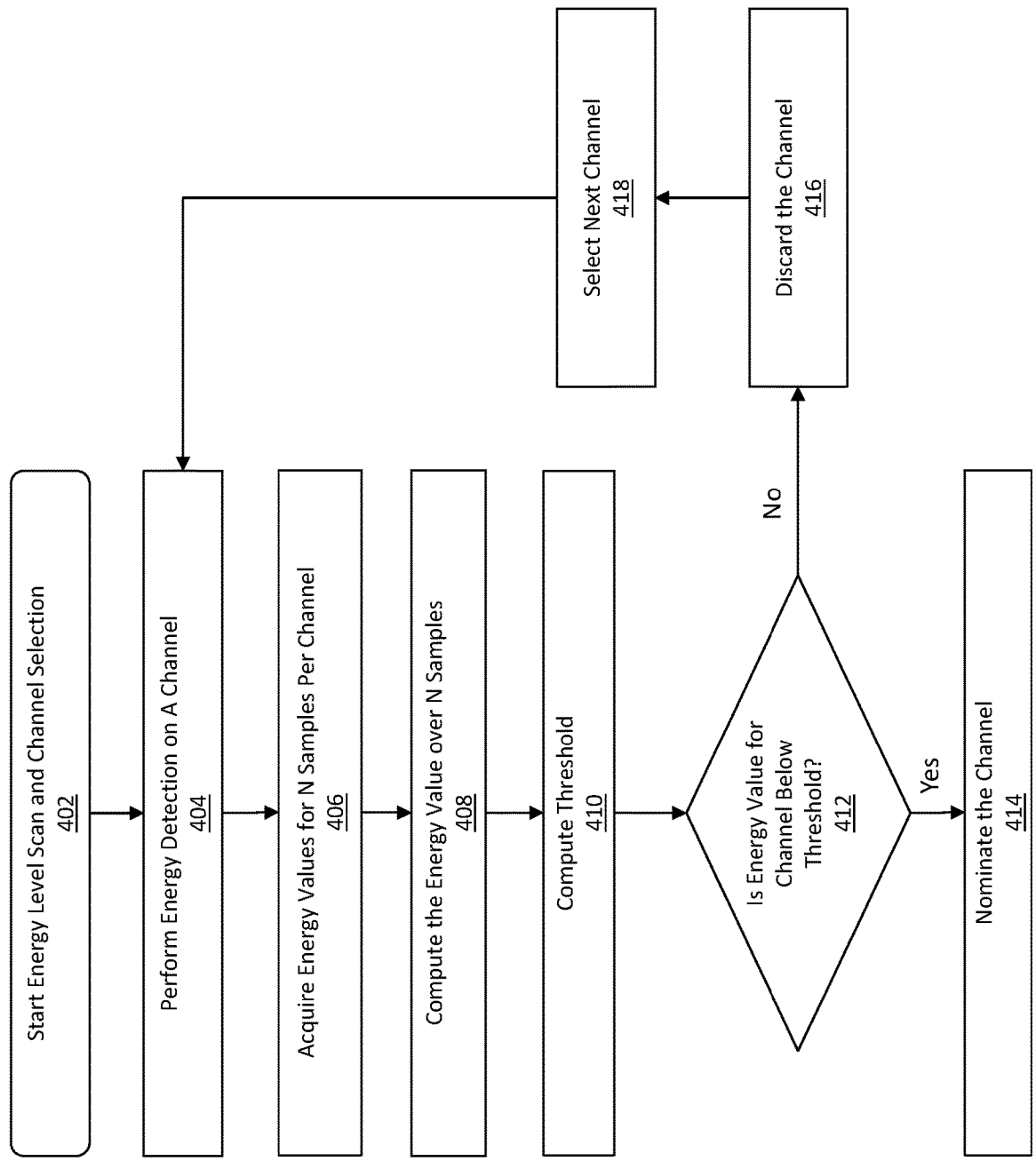
FIG. 4 is a process flow of a method in accordance with an embodiment of the disclosure.

FIG. 4 depicts a flow chart of a process for an energy level scan and selection of channels for deployment in the wireless network according to one or more embodiments. The process 304 begins with block 402 with the energy level scan and channel selection which can be initiated, as described above, by a network deployment or reconfiguration. At block 404, the process 304 includes performing an energy detection for a wireless network channel. Herein, wireless network channel refers to a single path provided by a wireless transmission medium via electrical separation, such as, for example, by frequency division or time division multiplexing. The energy detection for the wireless network channel refers to the detection of the energy level present on a channel (frequency range) based on the noise floor, ambient energy, interference sources, and unidentifiable Wi-Fi transmissions that may have been corrupted by can no longer be decoded. Energy values are in units of decibels. At block 406, the process 304 includes sampling energy values over N samples. The N samples can be set by the network controller 202 or predefined by a network administrator. In one or more embodiments, the wireless data controllers 40 perform the energy level scan. The samples are averaged over the N samples to compute the energy value for the channel, as shown at block 408. An energy level threshold is calculated, at block 410, for comparison to the energy level calculated for the channel. The energy level threshold is utilized to determine if the channel is busy or idle. At decision block 412, the method 304 compares the energy value for the channel to the energy level threshold to determine if the channel should be nominated or discarded. If the channel energy value is less than the threshold, the channel is nominated, as shown at block 414. If the channel energy value is above the threshold, the channel is discarded, as shown at block 416. A next channel is selected, at block 418, and the method 304 repeats until a certain number of channels have been nominated or if the method 304 runs out of channels.

In one or more embodiments, the network controller 202 selects the two network channels with the lowest energy levels from the nominated network channels. The two network channels can be referred to as a primary channel and a secondary channel for deployment in the wireless network. The primary channel and secondary channel provide for a redundant connection to the wireless network for the wireless sensors 42. Each of the wireless data controllers 40 can broadcast the primary channel and secondary channel. A particular wireless sensor 42 can connect to a primary channel though a first wireless data controller, and redundantly connect to the secondary channel through a second wireless data controller. The wireless sensor 42 can select the first and second wireless data controllers based on signal characteristic, proximity, and the like.

Additional processes may also be included. It should be understood that the processes depicted in FIG. 4 represent illustrations and that other processes may be added or existing processes may be removed, modified, or rearranged without departing from the scope and spirit of the present disclosure.

Figure 5:
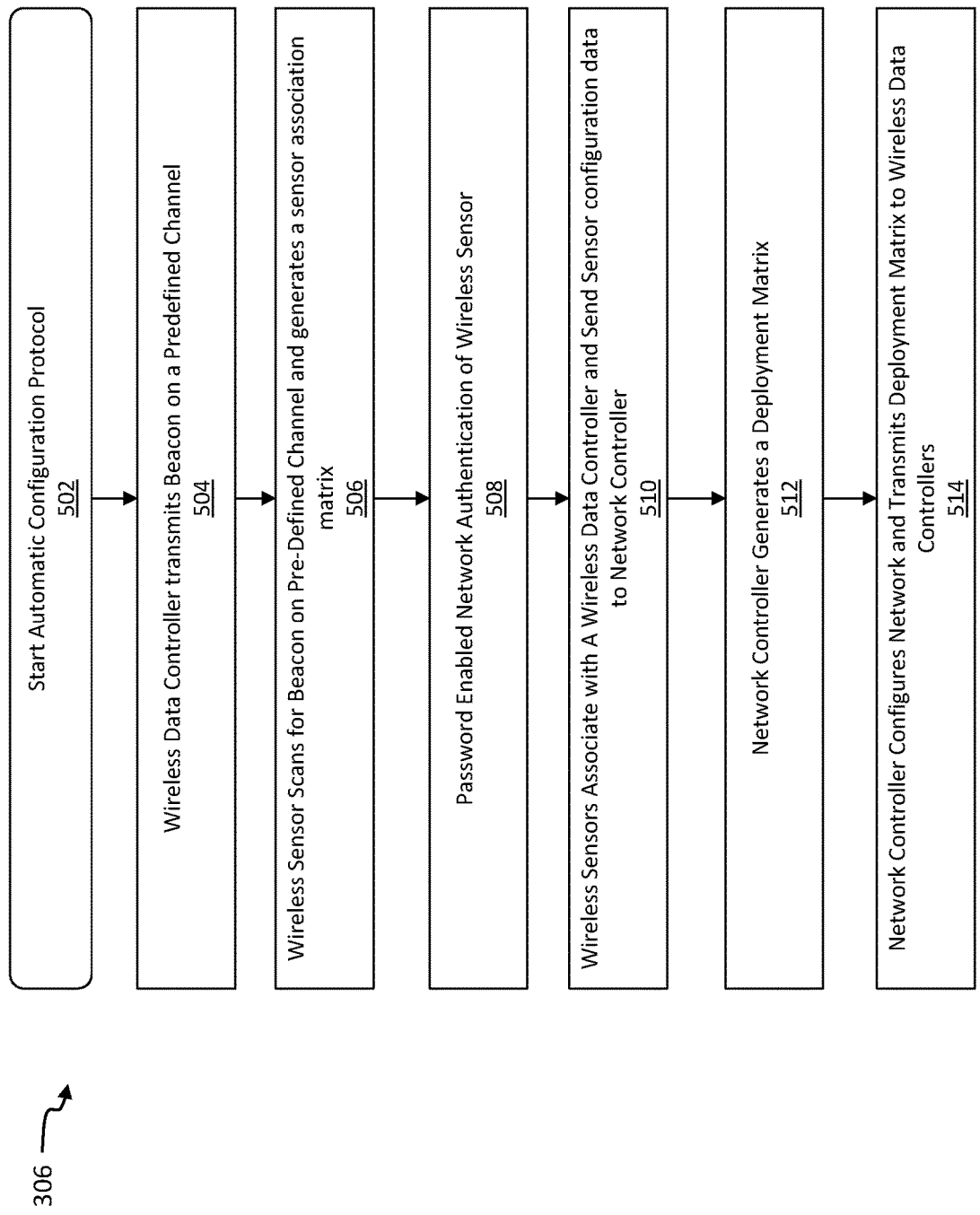
FIG. 5 is a process flow of a method in accordance with an embodiment of the disclosure.

FIG. 5 depicts a flow diagram of a method for configuration of the wireless network and generation of the deployment matrix according to one or more embodiments. The method 306 (from FIG. 3) includes the start of the automatic configuration protocol, as shown at block 502. The configuration can begin when the primary and second network channels have been selected or can be done concurrently with the energy level scan and network channel selection. The network controller 202, through the wireless data controllers (WDC) 40, transmits a beacon on a predefined channel, as shown at block 504. This pre-defined channel is known to the wireless sensors 42. The wireless sensors 42 can periodically scan for this beacon transmission or can be sent an indication that triggers the scan for this beacon on the predefined channel and generates a sensor association matrix, as shown at block 506. This beacon can transmit credentialing information to each of the wireless sensors 42 that allows the wireless sensors 42 to connect to the wireless data controllers 40. The wireless sensors 42 can verify the quality and strength of the radio frequency signal for each wireless data controller 40 can tag the identifiers (WDC IDs) of the wireless data controllers 40 based on their signal characteristics. The wireless sensors 42 identify and select the top two wireless data controllers 40 based on signal characteristic with one wireless data controller being designated as the primary channel data controller and the other wireless data controller being designated as the secondary channel data controller. The identifiers for these wireless data controllers (e.g., primary and secondary) are stored in the wireless sensor data memory. At block 508, the credentialing information (e.g., password, credentials, etc.) is utilized by the wireless sensor 42. And at block 510, the wireless sensor 42 associates with primary wireless data controller and secondary wireless data controller. Through the primary wireless data controller, the wireless sensor 42 can transmit sensor configuration data to the network controller 202. The sensor configuration data includes a sensor association matrix (SAM) and a sensor data interface (SDIx) description, as shown in the tables below. The sensor association matrix (SAM) includes the wireless sensor identifier and the identifiers of the primary and secondary WDCs. An example SAM is depicted in Table 1.

TABLE 1

Example Sensor Association Matrix

| Sensor Node ID | Primary WDC ID | Secondary WDC ID |
|---|---|---|
| 5 | C001 | C002 |

An example of a sensor data interface (SDIx) is depicted in Table 2, where each sensor includes information such as the sensor node ID, the number of sensing parameters, information about the sensing parameters as well as a data rate for the sensor. In the example in Table 2, the sensor node 5 is a temperature sensor that returns temperature in units of Celsius at a data rate of 1 hertz.

TABLE 2

Example Sensor Data Interface

| Sensor Node ID | | 5 |
| No. of Parameters | | 1 |
| Parameter Name | Unit | Data Rate |
| Temperature | Celsius | 1 Hz |

Returning to FIG. 5, the method 306 includes the network controller 202 generating a deployment matrix, as shown at block 512. An example deployment matrix is depicted in Table 3 below. The deployment matrix is created for each wireless data controller 40 and includes information about the wireless sensors connected through the wireless data controllers 40. The identifier for the WDC is included as well as the primary channel and the secondary channel. The maximum number of wireless sensors is stored in the deployment matrix along with the wireless sensor IDs for each node. The last column the sensor node description from the SDIx, as shown in table 2.

TABLE 3

Example Deployment Matrix

| WDC ID | Primary Channel | Secondary Channel | Max No. of Sensor Nodes | Permitted Sensor Nodes | SDIx description for Permitted Sensor Nodes |
|---|---|---|---|---|---|
| C001 | 5 | 8 | 5 | 2, 5, 7, 11, 23 | From Table 2 |

After the network controller generates the deployment matrix for each wireless data controller, the network controller 202 transmits the each respective deployment matrix to the WDCs, as shown in block 514. The network controller 202 also maintains the deployment matrix in a memory which can be utilize for reconfiguration. After completion of the network configuration, the network elements can be restarted to operate on the wireless network based on the configuration developed from this process 306.

Additional processes may also be included. It should be understood that the processes depicted in FIG. 5 represent illustrations and that other processes may be added or existing processes may be removed, modified, or rearranged without departing from the scope and spirit of the present disclosure.

In one or more embodiments, the network can be reconfigured and the primary and secondary channels can be adjusted based on the triggering of a redeployment. The redeployment can include a reconfiguration of the network elements as described in method 306, a rescan and reselection of a channels as described in method 304, or both. In one or more embodiments, a redeployment can occur after an initial configuration of the wireless network, during every network boot up, the network controller 202 scans the physical configuration of the wireless data controllers 40 and the wireless sensors 42 and compares this with the deployment matrixes stored in the memory for the network controller 202. In case an additional wireless sensor is detected, an automatic network deployment is performed either for the new wireless sensors or for all wireless sensors. The deployment, as mentioned above, can be just the reconfiguration of the network or can include the channel assignment/selection. If a wireless sensor has been removed from the network, the network controller 202 can trigger a redeployment or can remove the wireless sensor from the deployment matrix.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An avionic wireless sensor system comprising:
   a plurality of wireless sensors;
   a plurality of wireless data controllers each comprising a processing circuit and a memory;
   a network controller configured to operate the plurality of wireless data controllers and to perform a wireless network deployment operation responsive to a deployment trigger, the wireless network deployment operation comprising:
      scanning a plurality of wireless channels to determine an energy level for each channel in the plurality of wireless channels;
      selecting a primary channel and a secondary channel from the plurality of wireless channels based at least in part on the energy level of each channel; and
      selecting a primary wireless data controller and a secondary wireless data controller for each of the plurality of wireless sensor; and
      establishing, by the network controller, wireless communication with at least one of the plurality of wireless sensors over the primary channel and the secondary channel;
   wherein the network controller is further configured to:
      receive sensor configuration data from each of the plurality of wireless sensors, wherein the sensor configuration data comprises network parameters for the wireless sensor;
      store the sensor configuration data for each of the plurality of wireless sensors in a deployment matrix in the memory; and
      transmit the deployment matrix to each of the plurality of the wireless data controllers.

2. The avionic wireless sensor system of claim 1, wherein establishing wireless communication with each of the plurality of wireless sensors over the primary channel and the secondary channel comprises:
   transmitting, by the plurality of wireless data controllers, a beacon signal to the plurality of wireless sensors on a predefined wireless channel, wherein each of the plurality of wireless sensors are configured to scan for the beacon signal periodically;
   establishing wireless communication with each of the plurality of wireless sensors over the predefined channel;
   transmitting credentialing data to the plurality of wireless sensors over the predefined channel;
   responsive to receiving, from the plurality of wireless sensors, the credentialing data:
      establishing a primary connection with each of the plurality of wireless sensors on the corresponding primary wireless data controller on the primary channel; and
      establishing a secondary connection with each of the plurality of wireless sensors on the corresponding secondary wireless data controller on the secondary channel.

3. The avionic wireless sensor system of claim 2, wherein establishing the primary connection with the primary wireless data controller is based on one or more signal characteristics of the primary channel on a first gateway device.

4. The avionic wireless sensor system of claim 1, wherein the network controller is further configured to:
periodically obtain sensor configuration data from each of the plurality of wireless sensors;
compare the obtained sensor configuration data to the sensor configuration data in the deployment matrix; and
based on a determination that the obtained sensor configuration data does not match the sensor configuration data in the deployment matrix, trigger the wireless network deployment operation.

5. The avionic wireless sensor system of claim 1, wherein determining the energy level for each channel in the plurality of wireless channels comprises:
obtaining, by the plurality of wireless data controllers, a plurality of sample energy levels for each wireless channel; and
averaging the plurality of sample energy levels to determine the energy level for each channel in the plurality of wireless channels.

6. The avionic wireless sensor system of claim 1, wherein the selecting the primary channel and the secondary channel comprises:
comparing the energy level of each channel in the plurality of wireless channels to a calculated threshold to identify two or more candidate channels in the plurality of wireless channels that include energy levels below the calculated threshold;
selecting the primary channel from the two or more candidate channels; and
selecting the secondary channel from the two or more candidate channels, wherein the energy level for the primary channel is less than the energy level for the secondary channel.

7. The avionic wireless sensor system of claim 1, wherein the plurality of wireless sensors are located on an aircraft.

8. The avionic wireless sensor system of claim 7, wherein the network controller is further configured to trigger the wireless network deployment operation based at least in part on an operation of the aircraft.

9. The avionic wireless sensor system of claim 1, wherein the controller is further configured to trigger the wireless network deployment operation periodically.

10. A method of wireless network deployment, the method comprising:
scanning, by a network controller, a plurality of wireless channels to determine an energy level for each channel in the plurality of wireless channels;
selecting a primary channel and a secondary channel from the plurality of wireless channels based at least in part on the energy level;
selecting a primary wireless controller and a secondary wireless data controller for each of a plurality of wireless sensors; and
establishing, by the network controller, wireless communication with at least one of the plurality of wireless sensors over the primary channel and the secondary channel;
receiving sensor configuration data from each of the plurality of wireless sensors, wherein the sensor configuration data comprises network parameters for the wireless sensor; and
storing the sensor configuration data for each of the plurality of wireless sensors in a deployment matrix in a memory.

11. The method of claim 10, wherein establishing wireless communication with each of the plurality of wireless sensors over the primary channel and the secondary channel comprises:
transmitting, by a plurality of wireless data controllers, a beacon signal to the plurality of wireless sensors on a predefined wireless channel, wherein each of the plurality of wireless sensors are configured to scan for the beacon signal periodically;
establishing wireless communication with each of the plurality of wireless sensors over the predefined channel;
transmitting credentialing data to the plurality of wireless sensors over the predefined channel;
responsive to receiving, from the plurality of wireless sensors, the credentialing data:
establishing a primary connection with each of the plurality of wireless sensors on the corresponding primary wireless data controller on the primary channel; and
establishing a secondary connection with each of the plurality of wireless sensors on the corresponding secondary wireless data controller on the secondary channel.

12. The method of claim 11, wherein establishing the primary connection with the first wireless data controller is based on one or more signal characteristics of the primary channel on a first gateway device.

13. The method of claim 10, further comprising:
periodically obtaining sensor configuration data from each of the plurality of wireless sensors;
comparing the obtained sensor configuration data to the sensor configuration data in the deployment matrix; and
based on a determination that the obtained sensor configuration data does not match the sensor configuration data in the deployment matrix, triggering a wireless network redeployment operation.

14. The method of claim 10, wherein determining the energy level for each channel in the plurality of wireless channels comprises:
obtaining, by a plurality of wireless data controllers, a plurality of sample energy levels for each wireless channel; and
averaging the plurality of sample energy levels to determine the energy level for each channel in the plurality of wireless channels.

15. The method of claim 10, wherein the selecting the primary channel and the secondary channel comprises:
comparing the energy level of each channel in the plurality of wireless channels to a calculated threshold to identify two or more candidate channels in the plurality of wireless channels that include energy levels below the calculated threshold;
selecting the primary channel from the two or more candidate channels; and
selecting the secondary channel from the two or more candidate channels, wherein the energy level for the primary channel is less than the energy level for the secondary channel.

16. The method of claim 10, wherein the plurality of wireless sensors are located on an aircraft.

17. The method of claim 16, further comprising triggering a wireless network redeployment operation based at least in part on an operation of the aircraft.

18. The method of claim 10, further comprising triggering a wireless network redeployment operation periodically.

* * * * *